United States Patent
Kuramochi et al.

(10) Patent No.: US 10,008,904 B2
(45) Date of Patent: Jun. 26, 2018

(54) VEHICLE DRIVE DEVICE

(71) Applicant: AISIN AW CO., LTD., Anjo-shi, Aichi-ken (JP)

(72) Inventors: Satoshi Kuramochi, Okazaki (JP); Manabu Miyazawa, Anjo (JP); Tatsuyuki Uechi, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 348 days.

(21) Appl. No.: 14/780,155

(22) PCT Filed: Mar. 19, 2014

(86) PCT No.: PCT/JP2014/057461
§ 371 (c)(1),
(2) Date: Sep. 25, 2015

(87) PCT Pub. No.: WO2014/192380
PCT Pub. Date: Dec. 4, 2014

(65) Prior Publication Data
US 2016/0072361 A1 Mar. 10, 2016

(30) Foreign Application Priority Data

May 31, 2013 (JP) .................................. 2013-116027
Sep. 11, 2013 (JP) .................................. 2013-188889

(51) Int. Cl.
*H02K 7/11* (2006.01)
*H02K 7/116* (2006.01)
(Continued)

(52) U.S. Cl.
CPC ............... *H02K 7/116* (2013.01); *B60K 6/22* (2013.01); *B60K 6/36* (2013.01); *B60K 6/40* (2013.01);
(Continued)

(58) Field of Classification Search
CPC .... H02K 7/1116; H02K 11/0073; H02K 5/22; B60K 6/22; B60K 6/36; B60K 6/40; B60K 6/405; B60K 6/48; B60L 11/14
(Continued)

(56) References Cited

U.S. PATENT DOCUMENTS 6,118,237 A 9/2000 Kikuchi et al.
6,166,498 A 12/2000 Yamaguchi et al.
(Continued)

FOREIGN PATENT DOCUMENTS

JP 2000-023307 A 1/2000
JP 2000-217205 A 8/2000
(Continued)

OTHER PUBLICATIONS

U.S. Appl. No. 14/780,130, filed Sep. 25, 2015 in the name of Takahashi et al.
(Continued)

*Primary Examiner* — Terrance Kenerly
(74) *Attorney, Agent, or Firm* — Oliff PLC

(57) ABSTRACT

A vehicle drive device that includes a rotary electric machine; a transmission device that is disposed side by side with the rotary electric machine in an axial direction thereof; a differential gear device that has a rotation-axial center substantially parallel to that of the transmission device, and is disposed on an axis other than that of the transmission device; and an inverter device that includes a capacitor that smooths direct-current power and a conversion unit that performs direct current/alternating current conversion, and controls the rotary electric machine.

15 Claims, 6 Drawing Sheets

(51) Int. Cl.
| | | |
|---|---|---|
| *B60K 6/36* | (2007.10) | |
| *B60K 6/40* | (2007.10) | |
| *B60K 6/405* | (2007.10) | |
| *B60K 6/48* | (2007.10) | |
| *B60K 17/04* | (2006.01) | |
| *B60L 11/14* | (2006.01) | |
| *B60K 6/22* | (2007.10) | |
| *H02K 5/22* | (2006.01) | |
| *H02K 11/00* | (2016.01) | |

(52) U.S. Cl.
CPC ............... *B60K 6/405* (2013.01); *B60K 6/48* (2013.01); *B60K 17/04* (2013.01); *B60L 11/14* (2013.01); *H02K 5/22* (2013.01); *H02K 11/0073* (2013.01); *B60Y 2400/61* (2013.01); *Y02T 10/6221* (2013.01); *Y10S 903/903* (2013.01)

(58) Field of Classification Search
USPC ...................................................... 310/68 D
See application file for complete search history.

(56) References Cited

U.S. PATENT DOCUMENTS

| | | | | |
|---|---|---|---|---|
| 7,786,640 | B2* | 8/2010 | Sada | B60K 6/365 310/112 |
| 2002/0060099 | A1 | 5/2002 | Takenaka et al. | |
| 2004/0226761 | A1 | 11/2004 | Takenaka et al. | |
| 2005/0211490 | A1* | 9/2005 | Shimizu | B60K 1/00 180/243 |
| 2006/0201730 | A1* | 9/2006 | Kaneko | B60L 11/12 180/243 |
| 2009/0071784 | A1 | 3/2009 | Combs et al. | |
| 2009/0100965 | A1* | 4/2009 | Sanji | B60K 6/26 74/606 R |
| 2009/0206709 | A1* | 8/2009 | Kakuda | B60K 6/405 310/68 D |
| 2010/0084206 | A1 | 4/2010 | Yoshida et al. | |
| 2010/0127586 | A1 | 5/2010 | Yoshida et al. | |
| 2012/0248909 | A1* | 10/2012 | Ito | H02M 7/003 310/64 |
| 2016/0039276 | A1 | 2/2016 | Takahashi et al. | |
| 2016/0052380 | A1 | 2/2016 | Miyazawa et al. | |
| 2016/0072361 | A1 | 3/2016 | Kuramochi et al. | |

FOREIGN PATENT DOCUMENTS

| | | | | |
|---|---|---|---|---|
| JP | 2001-119898 | A | | 4/2001 |
| JP | 2001-187535 | A | | 7/2001 |
| JP | 2001-322439 | A | | 11/2001 |
| JP | 2002-120575 | A | | 4/2002 |
| JP | 2004-153897 | A | | 5/2004 |
| JP | 2004-215348 | A | | 7/2004 |
| JP | 2004-222354 | A | | 8/2004 |
| JP | 2004-343845 | A | | 12/2004 |
| JP | 2007124764 | | * 5/2007 | ............... H02K 9/02 |
| JP | 2007-166803 | A | | 6/2007 |
| JP | 2008-290621 | A | | 12/2008 |
| JP | 2008-301572 | A | | 12/2008 |
| JP | 2009-101730 | A | | 5/2009 |
| JP | 2009-201218 | A | | 9/2009 |
| JP | 2011-067093 | A | | 3/2011 |
| JP | 2011-213230 | A | | 10/2011 |
| JP | 2012-065436 | A | | 3/2012 |
| JP | 2012-121549 | A | | 6/2012 |
| JP | 2012-162132 | A | | 8/2012 |
| JP | 2012-217263 | A | | 11/2012 |
| WO | 2009-104491 | A1 | | 8/2009 |
| WO | 2014/192376 | A1 | | 12/2014 |

OTHER PUBLICATIONS

U.S. Appl. No. 14/780,335, filed Sep. 25, 2015 in the name of Suzuki et al.
U.S. Appl. No. 14/780,135, filed Sep. 25, 2015 in the name of Miyazawa et al.

* cited by examiner

VEHICLE DRIVE DEVICE

BACKGROUND

The present disclosure relates to a rotary electric machine, and to a vehicle drive device including an inverter device that controls the rotary electric machine.

Units designed to be used in combination with one another are preferably integrated in one case. From such a point of view, Japanese Patent Application Publication No. 2007-166803 discloses a vehicle drive device in which one case accommodates rotary electric machines (motor-generators MG1 and MG2) and an inverter device (power control unit 21) that control the rotary electric machines. The inverter device includes a capacitor (smoothing capacitor C2) that smooths direct-current power and conversion units (inverters 14 and 22) that perform direct current/alternating current conversion.

In the device of Japanese Patent Application Publication No. 2007-166803, the capacitor and the conversion units included in the inverter device are arranged in different positions side by side along the vehicle front-rear direction. In such a layout, the capacitor projects in the vehicle front-rear direction, as shown in FIG. 6 of Japanese Patent Application Publication No. 2007-166803, leading to an increase in the overall size of the device. Japanese Patent Application Publication No. 2007-166803 describes a layout of the capacitor and the conversion units in relation to the rotary electric machine (refer to paragraph 0081, for example), but does not disclose a layout that further takes into account a relation of the capacitor and the conversion units with the vehicle in the longitudinal direction thereof when they are mounted on the vehicle.

SUMMARY

In view of the foregoing, an exemplary aspect of the present disclosure includes a layout that downsizes the entire vehicle drive device including an inverter device and is suitable when the vehicle drive device is mounted on a vehicle.

The present disclosure provides a vehicle drive device including: a rotary electric machine, a transmission device that is disposed side by side with the rotary electric machine in an axial direction thereof, a differential gear device that has a rotation-axial center substantially parallel to that of the transmission device, and is disposed on an axis other than that of the transmission device, and an inverter device that includes a capacitor that smooths direct-current power and a conversion unit that performs direct current/alternating current conversion, and controls the rotary electric machine, wherein in a state in which the vehicle drive device is mounted on a vehicle, the rotation-axial center of the differential gear device is disposed below and on a vehicle rear side of the rotation-axial center of the transmission device, and in that at least a part of the capacitor and at least a part of the conversion unit are disposed so as to overlap each other in a vehicle front-rear direction, and at least a part of the capacitor and at least a part of the conversion unit are disposed so as to overlap the differential gear device in the vehicle front-rear direction, above the differential gear device.

The term "rotary electric machine" used in the present application refers to any of a motor (electric motor), a generator (electric generator), and a motor-generator that functions both as a motor and as a generator as necessary.

The term "vehicle front-rear direction" refers to a direction parallel to the direction of travel of the vehicle while running straight ahead.

According to this configuration, the capacitor overlaps the conversion unit in the vehicle front-rear direction, so that the vehicle drive device can be downsized in the vehicle front-rear direction compared to a case in which the capacitor and the conversion unit are disposed in different positions side by side along the vehicle front-rear direction. In addition, the capacitor and the conversion unit can be disposed close to the vehicle rear side. Thus, if a collision occurs when the vehicle is running forward, the impact of the collision is unlikely to reach the capacitor that is a high-voltage component. As a result, collision safety can be improved.

Preferable aspects of the present disclosure will be described below.

In one aspect of the present disclosure, the capacitor is preferably disposed so as to overlap the conversion unit when viewed in the vertical direction, below the conversion unit.

In the present application, with regard to the arrangement of two members, the phrase "overlap each other when viewed in a certain direction" means that when a virtual straight line parallel to the direction of the viewing is moved in directions that are orthogonal to the virtual straight line, the virtual straight line crosses both the two members in at least some region.

According to this configuration, the capacitor and the conversion unit overlap each other when viewed in the vertical direction, so that the capacitor and the conversion unit can be electrically connected to each other at a short wiring length.

In another aspect of the present disclosure, at least one of the capacitor and the conversion unit is preferably arranged so as to overlap the transmission device in the vertical direction.

According to this configuration, the vehicle drive device can be downsized in the vertical direction compared to the case in which the entirety of the capacitor and the conversion unit is disposed so as to occupy a position in the vertical direction different from that of the transmission device.

In still another aspect of the present disclosure, the vehicle drive device preferably further includes a counter gear mechanism that has a rotation-axial center substantially parallel to those of the transmission device and the differential gear device and is disposed on an axis other than those of the transmission device and the differential gear device. In the state in which the vehicle drive device is mounted on the vehicle, the rotation-axial center of the counter gear mechanism is preferably disposed above the rotation-axial center of the transmission device in the vertical direction and between the rotation-axial center of the transmission device and the rotation-axial center of the differential gear device in the vehicle front-rear direction, and at least one of the capacitor and the conversion unit is preferably disposed so as to overlap the counter gear mechanism in the vertical direction.

According to this configuration, the vehicle drive device can be downsized in the vertical direction compared to the case in which the entirety of the capacitor and the conversion unit is disposed so as to occupy a position in the vertical direction different from that of the counter gear mechanism.

In still another aspect of the present disclosure, preferably, the vehicle drive device further includes a case that accommodates the transmission device, in which an inverter accommodation chamber that accommodates the inverter device is formed along an outer peripheral wall of the case.

According to this configuration, the inverter accommodation chamber is formed along and outside the outer peripheral wall of the case that accommodates the transmission device, so that entry of oil in the case into the inverter accommodation chamber can be suppressed. In addition, it is easy to fix the inverter device to the case in the inverter accommodation chamber directly not via a dedicated inverter case, so that the entire device can be downsized while reducing the number of components.

DETAILED DESCRIPTION OF THE EMBODIMENTS

An embodiment of a vehicle drive device according to the present disclosure will be described with reference to the drawings. A vehicle drive device 1 according to the present embodiment is a vehicle drive device (hybrid vehicle drive device) for driving a vehicle (hybrid vehicle) including both an internal combustion engine E and a rotary electric machine MG as sources of driving force of wheels W. Specifically, the vehicle drive device 1 is configured as a drive device for a one-motor parallel hybrid vehicle. In the following description, terms regarding a direction, a position, etc. of each member may allow a difference due to a manufacturing error. In addition, the direction of each member indicates a direction when the member is assembled to the vehicle drive device 1.

Figure 1:
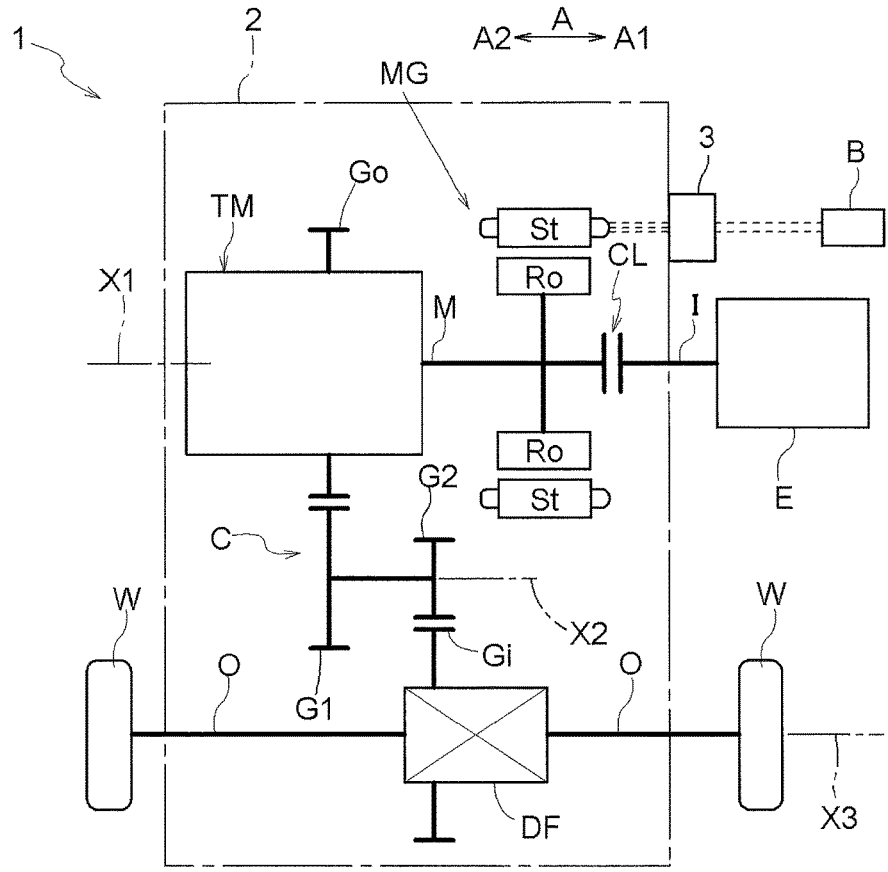
FIG. 1 is a schematic diagram showing a schematic configuration of a vehicle drive device.

As shown in FIG. 1, the vehicle drive device 1 includes an input shaft I drivingly coupled to the internal combustion engine E, a plurality of output shafts O (two, in this example) each drivingly coupled to corresponding one of the wheels W (two, in this example), the rotary electric machine MG, a transmission device TM, and a differential gear device DF. The term "drivingly coupled" means a state in which two rotational elements are coupled to each other so as to be capable of transmitting a driving force (a synonym for torque). This concept includes a state in which the two rotational elements are coupled so as to rotate together with each other and a state in which the two rotational elements are coupled so as to be capable of transmitting the driving force via one or more transmitting members. In the present embodiment, the vehicle drive device 1 further includes an engagement device CL and a counter gear mechanism C. The engagement device CL, the rotary electric machine MG, the transmission device TM, the counter gear mechanism C, and the differential gear device DF are provided in a power transmission path that connects between the input shaft I and the output shafts O. These components are provided in the order in which they are mentioned from the input shaft I side. In addition, these components are accommodated in a case (drive device case) 2.

The rotary electric machine MG is disposed coaxially with the input shaft I. The transmission device TM is disposed side by side with the input shaft I and the rotary electric machine MG in the direction of the rotation-axial center thereof. In the present embodiment, the transmission device TM is disposed coaxially with the input shaft I and the rotary electric machine MG. The input shaft I, the rotary electric machine MG, and the transmission device TM are disposed in the order in which they are mentioned from the internal combustion engine E side. The counter gear mechanism C has a rotation-axial center substantially parallel to that of the input shaft I etc., and is disposed on an axis other than that of the input shaft I etc. In addition, the differential gear device DF has a rotation-axial center substantially parallel to those of the input shaft I etc. and the counter gear mechanism C, and is disposed on an axis other than those of the input shaft I etc. and the counter gear mechanism C. The term "substantially parallel" means a state that can be deemed as a state of being parallel or practically parallel (for example, a state of intersecting at an angle of five degrees or smaller).

In the present embodiment, the rotation-axial center common to the input shaft I, the rotary electric machine MG, and the transmission device TM is referred to as a "first axial center X1". The rotation-axial center of the counter gear mechanism C is referred to as a "second axial center X2", and the rotation-axial center of the differential gear device DF is referred to as a "third axial center X3". The first axial center X1, the second axial center X2, and the third axial center X3 are disposed so as to be positioned at the vertexes of a triangle (a obtuse triangle with a central angle of 90 degrees to 110 degrees, in this example) when viewed in an axial direction A parallel to the axial centers X1, X2, and X3. Such a multi-axis configuration (three-axis configuration, in this example) is suitable as a configuration when the vehicle drive device 1 is mounted, for example, on a front-engine front-drive (FF) vehicle (refer to FIG. 2).

Figure 2:
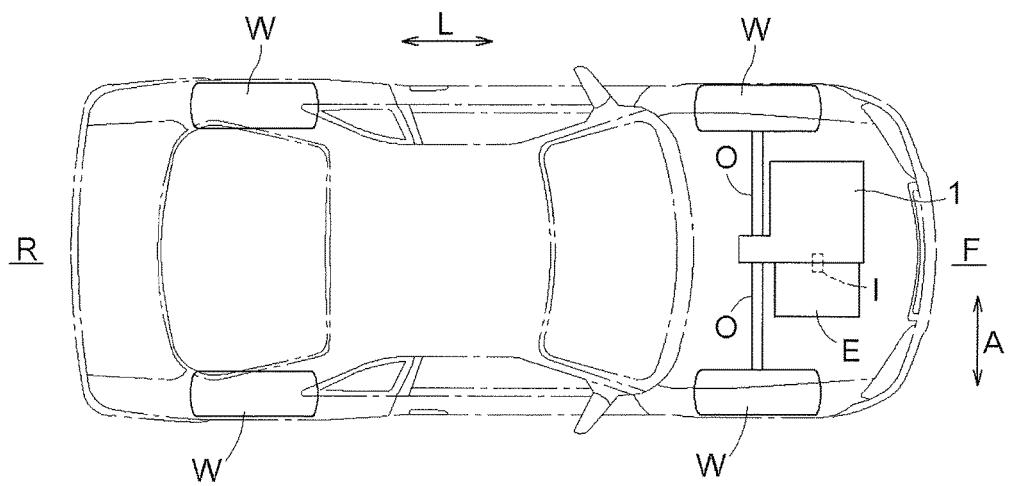
FIG. 2 is a schematic diagram showing a vehicle-mounted state of the vehicle drive device.
Figure 3:
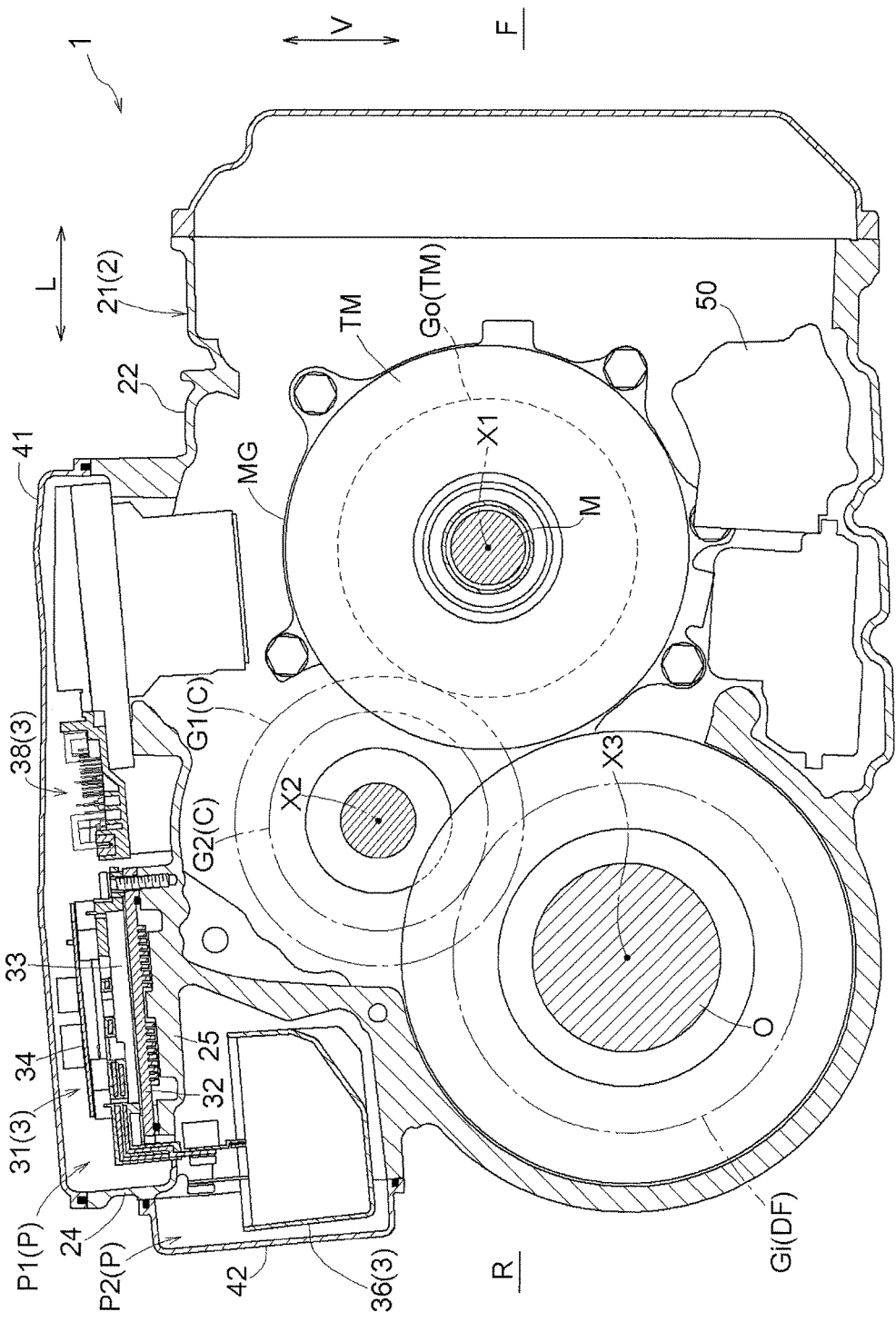
FIG. 3 is a view of the vehicle drive device when viewed in an axial direction.

The vehicle drive device 1 according to the present embodiment is configured as a transverse-mounted drive device in which the axial direction A serving as a direction of connection to the internal combustion engine E is disposed orthogonal to a longitudinal direction (vehicle front-rear direction) L (refer to FIG. 2). In the present embodiment, the traveling direction side of the vehicle when it runs forward is referred to as a "front side F" in the longitudinal direction L, and the opposite side thereof is referred to as a "rear side R" in the longitudinal direction L. As shown in FIG. 3 showing a vehicle-mounted state (a state in which the vehicle drive device 1 is mounted on the vehicle), the third axial center X3 is disposed below and on the rear side R of the first axial center X1. The second axial center X2 is disposed above the first axial center X1 and the third axial center X3 in a vertical direction V. The second axial center X2 is disposed between the first axial center X1 and the third axial center X3 (on the rear side R of the first axial center X1 and the front side F of the third axial center X3) in the longitudinal direction L.

In the present embodiment, the direction toward the internal combustion engine E (rightward in FIG. 1) when viewed from the rotary electric machine MG in the axial direction A is defined as an "axial first direction A1"; and the direction toward the transmission device TM (leftward in FIG. 1) when viewed from the rotary electric machine MG is defined as an "axial second direction A2".

As shown in FIG. 1, the input shaft I serving as an input member is drivingly coupled to the internal combustion engine E. The internal combustion engine E is a motor (such as a gasoline engine or a diesel engine) driven by combustion of fuel in the engine to take out power. In the present embodiment, the input shaft I is drivingly coupled to an output shaft (such as a crankshaft) of the internal combustion engine E. The input shaft I may be drivingly coupled to the output shaft of the internal combustion engine E, for example, via a damper.

The engagement device CL is provided in the power transmission path connecting between the input shaft I and the rotary electric machine MG The engagement device CL selectively drivingly couples the input shaft I (internal combustion engine E) and the rotary electric machine MG to each other. The engagement device CL functions as an internal combustion engine-disengaging engagement device for disengaging the internal combustion engine E from the wheels W. In the present embodiment, the engagement device CL is constituted as a hydraulically driven friction engagement device. The engagement device CL may be, for example, an electromagnetically driven friction engagement device or a meshing engagement device.

The rotary electric machine MG includes a stator St fixed to the case 2 and a rotor Ro supported on radially inside of the stator St so as to be freely rotatable. The rotary electric machine MG can function as a motor (electric motor) for generating power by being supplied with electric power, and as a generator (electric generator) for generating electric power by being supplied with power. The rotary electric machine MG is electrically connected to an electric storage device B (such as a battery or a capacitor) serving as a direct-current power supply via an inverter device 3. The rotary electric machine MG performs power running by being supplied with the electric power from the electric storage device B, or generates the electric power from torque of the internal combustion engine E or an inertial force of the vehicle and supplies the generated electric power to the electric storage device B to accumulate the electric power. The rotor Ro of the rotary electric machine MG is coupled to an intermediate shaft M so as to rotate together with the shaft M. The intermediate shaft M also serves as an input shaft of the transmission device TM (transmission input shaft).

In the present embodiment, the transmission device TM includes a plurality of gear mechanisms and a plurality of engagement devices for shifting, and is an automatic stepped transmission device that can switch between a plurality of shift speeds with different speed ratios. An automatic continuously variable transmission device that can steplessly change the speed ratio, a stepped manual transmission device that includes a plurality of shift speeds with different speed ratios so as to be manually switchable by a driver, and a fixed transmission device that includes a single shift speed with a fixed speed ratio may also be used as the transmission device TM. The transmission device TM transfers rotation and torque input to the intermediate shaft M to a transmission output gear Go serving as an output member (transmission output member) of the transmission device TM with the speed changed at a speed ratio at each timing and torque converted.

The transmission output gear Go is drivingly coupled to the counter gear mechanism C. The counter gear mechanism C includes a first gear G1 and a second gear G2, each formed on a common shaft member. The first gear G1 meshes with the transmission output gear Go of the transmission device TM. The second gear G2 meshes with a differential input gear Gi of the differential gear device DF. In the present embodiment, the second gear G2 is disposed on the side in the axial first direction A1 (internal combustion engine E side) with respect to the first gear G1. The second gear G2 is formed to have a smaller diameter (smaller number of teeth) than the first gear G1.

The differential gear device (output differential gear device) DF is drivingly coupled to the wheels W via the output shafts O serving as output members. The differential gear device DF includes the differential input gear Gi and a differential body (body of the differential gear device DF) coupled to the differential input gear Gi. The differential body is configured to include a plurality of bevel gears meshing with each other and a differential case that accommodates the plurality of bevel gears. The differential gear device DF distributes and transmits the rotation and the torque input to the differential input gear Gi from the rotary electric machine MG side via the transmission device TM and the counter gear mechanism C to the two, left and right, output shafts O (that is, the two, left and right, wheels W), in the differential body portion. In this way, the vehicle drive device 1 can transmit the torque of at least one of the internal combustion engine E and the rotary electric machine MG to the wheels W to drive the vehicle.

The vehicle drive device 1 includes a mechanical oil pump (not shown) drivingly coupled to the intermediate shaft M. The mechanical oil pump uses the torque of the internal combustion engine E or the rotary electric machine MG to discharge oil while at least one of the internal combustion engine E and the rotary electric machine MG is rotating. In the present embodiment, the vehicle drive device 1 further includes an electric oil pump 50 (refer to FIG. 3) driven by a rotary electric machine for a pump (not shown) provided independent of the power transmission path which connects between the input shaft I and the output shafts O. The electric oil pump 50 uses torque of the rotary electric machine for a pump to discharge oil while the rotary electric machine for a pump is rotating.

The oil discharged from at least one of the mechanical oil pump and the electric oil pump 50 is used, for example, for controlling the state of engagement of the engagement devices for shifting included in the transmission device TM, for cooling the rotary electric machine MG, and for lubricating various parts and so forth. In the present embodiment, with the provision of the electric oil pump 50, oil can be supplied to the engagement devices for shifting to establish engagement states thereof even when the internal combustion engine E is stationary, so that the vehicle can be appropriately started. The vehicle drive device 1 according to the present embodiment can be suitably applied to a drive device for a hybrid vehicle having an idle stop function.

Figure 4:
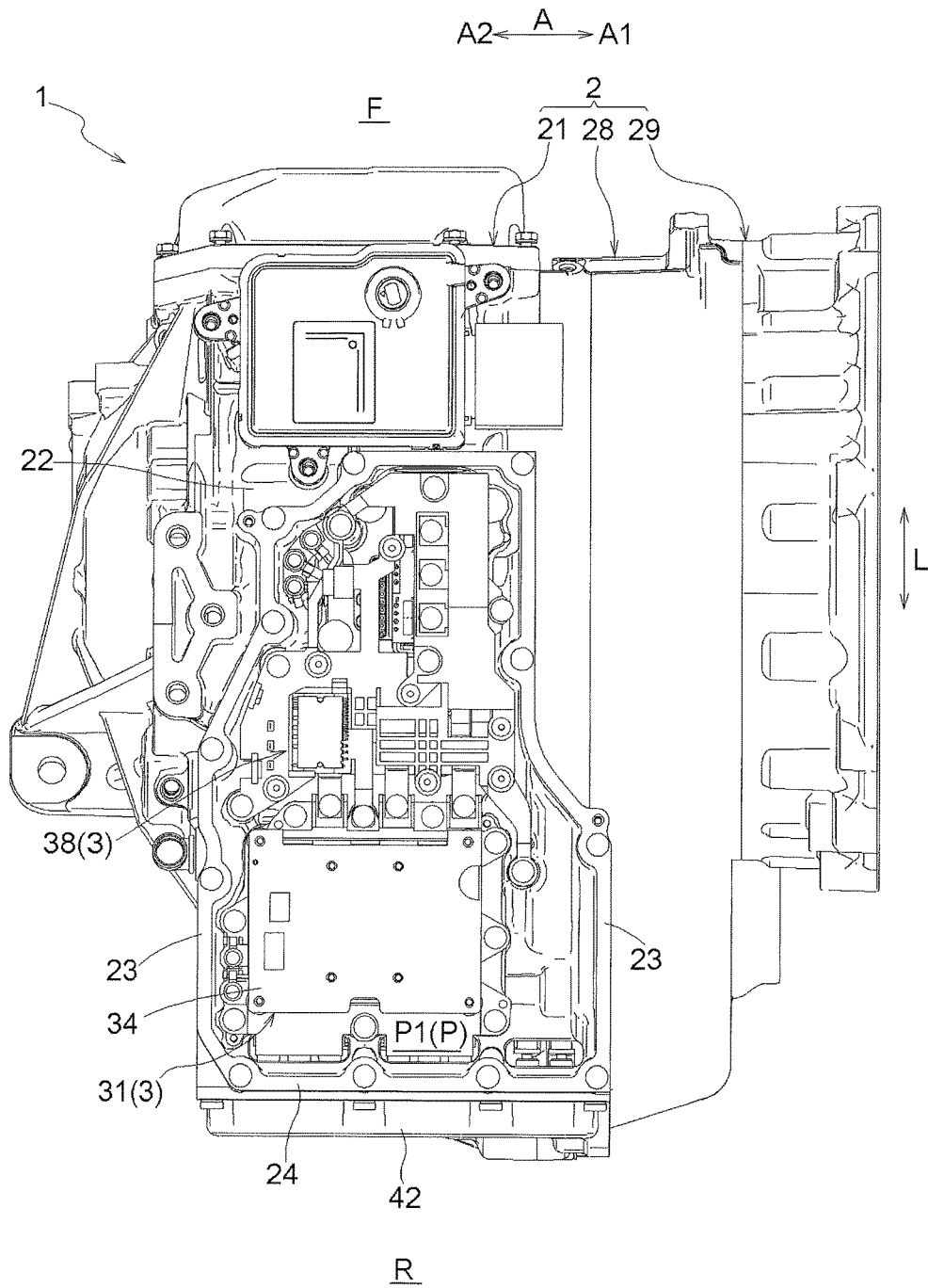
FIG. 4 is a view of the vehicle drive device when viewed in a vertical direction.

As shown in FIG. 4, the case 2 that accommodates the rotary electric machine MG and the transmission device TM etc. includes a first case portion 21 and a second case portion 28 formed to be split in the axial direction A. The first case portion 21 forms an accommodation space mainly for the transmission device TM and the counter gear mechanism C. The second case portion 28 forms an accommodation space mainly for the rotary electric machine MG and the engagement device CL. In the present embodiment, an accommodation space for the differential gear device DF is formed to extend between the first case portion 21 and the second case portion 28 (refer also to FIG. 5). The second case portion 28 is joined to the first case portion 21 from the axial first direction A1 side. In this example, the vehicle drive device 1 includes a damper, and a third case portion 29 that forms an accommodation space for the damper is joined to the second case portion 28 from the axial first direction A1 side. In this way, the third case portion 29, the second case portion 28, and the first case portion 21 are disposed such that the distance of spacing from the internal combustion engine E along the axial direction A becomes longer in the order in which they are mentioned.

As shown in FIG. 3, the inverter device 3 for controlling the rotary electric machine MG is integrated with the case 2. The inverter device 3 is integrally fixed to the case 2 directly, not via an inverter case or other parts for accommodating the inverter device 3 or the like. That is, the vehicle drive device 1 according to the present embodiment adopts an inverter-caseless structure. Such an inverter-caseless structure requires no dedicated inverter case, as a matter of course, and requires no fixing seat for fixing the inverter case to the case 2. Hence, it is possible to reduce the cost by reducing the number of components. The entire device can also be downsized.

As clearly shown in FIG. 4, in the present embodiment, the inverter device 3 is fixed to the first case portion 21 that accommodates the transmission device TM etc., not to the second case portion 28 that accommodates the rotary electric machine MG etc. In the present embodiment, in order to reduce the overall length in the axial direction A of the device, the rotary electric machine MG which has a large diameter and a small thickness is used. Therefore, the transmission device TM has a smaller diameter than that of the rotary electric machine MG Consequently, an annular space is formed radially outside the transmission device TM because of the difference between the outside diameter of the rotary electric machine MG and the outside diameter of the transmission device TM. Accordingly, the inverter device 3 is disposed by effectively utilizing at least a part of the annular space, whereby the entire vehicle drive device 1 including the integrated inverter device 3 is downsized. The inverter device 3 is fixed to the first case portion 21 that is disposed on the side opposite to the internal combustion engine E with respect to the second case portion 28. In this way, by disposing the inverter device 3 with more spacing from the internal combustion engine E, it is possible to prevent heat from the internal combustion engine E from reaching the inverter device 3. The inverter device 3 can be disposed in a relatively wide space away from auxiliaries disposed near the internal combustion engine E.

As shown in FIGS. 3 and 4, the first case portion 21 includes an outer peripheral wall 22 formed in a deformed cylindrical shape along the outer shape of the transmission device TM, the counter gear mechanism C, and the differential gear device DF, and also includes a pair of projecting walls 23 disposed to project outward from the outer peripheral wall 22 so as to oppose to each other. A space defined by the outer peripheral wall 22 and the pair of projecting walls 23 forms an inverter accommodation chamber P. In this way, the inverter accommodation chamber P is formed along the outer peripheral wall 22 of the case 2 (first case portion 21). The inverter accommodation chamber P accommodates the inverter device 3. The inverter device 3 is integrally fixed to the case 2 (first case portion 21) in the inverter accommodation chamber P.

The inverter device 3 includes a conversion unit 31 and a capacitor 36. The conversion unit (direct current/alternating current conversion unit) 31 converts between direct-current power and alternating-current power. As shown in FIG. 3, the conversion unit 31 includes a flat plate-shaped base plate 32 and a plurality of switching elements 33 fixed on the base plate 32. The base plate 32 is constituted of a highly thermally conductive material (for example, a metal material such as copper or aluminum), and also functions as a heat sink. For example, insulated gate bipolar transistors (IGBTs) or metal-oxide-semiconductor field-effect transistors (MOSFETs) are used as the switching elements 33. The conversion unit 31 includes rectifying devices each made from, for example, a diode. The rectifying devices are connected in parallel with the switching elements 33. A control board 34 for controlling switching of the switching elements 33 is fixed to the base plate 32. The conversion unit 31 is formed in a flat rectangular parallelepiped shape as a whole.

The capacitor 36 smooths (suppresses fluctuations in) the direct-current power exchanged between the electric storage device B and the conversion unit 31. For example, a film capacitor made from a synthetic resin, a ceramic capacitor made from an inorganic material, or the like can be used as the capacitor 36. The capacitor 36 as described above has a relatively high degree of freedom in design in terms of the size and the shape, and thus can be adjusted in accordance with the size and the shape of the space in which the capacitor 36 is disposed. In this example, the capacitor 36 is formed in the shape of rectangular parallelepiped (block) with low flatness compared to the conversion unit 31.

In the present embodiment, the inverter device 3 further includes a pump control unit 38. The pump control unit 38 controls the rotary electric machine for a pump for driving the electric oil pump 50. The pump control unit 38 is constituted by including, as a core, switching elements and a control board for controlling the switching elements, in the same manner as in the conversion unit 31. The pump control unit 38 is also formed flat as a whole, in the same manner as in the conversion unit 31.

Figure 5:
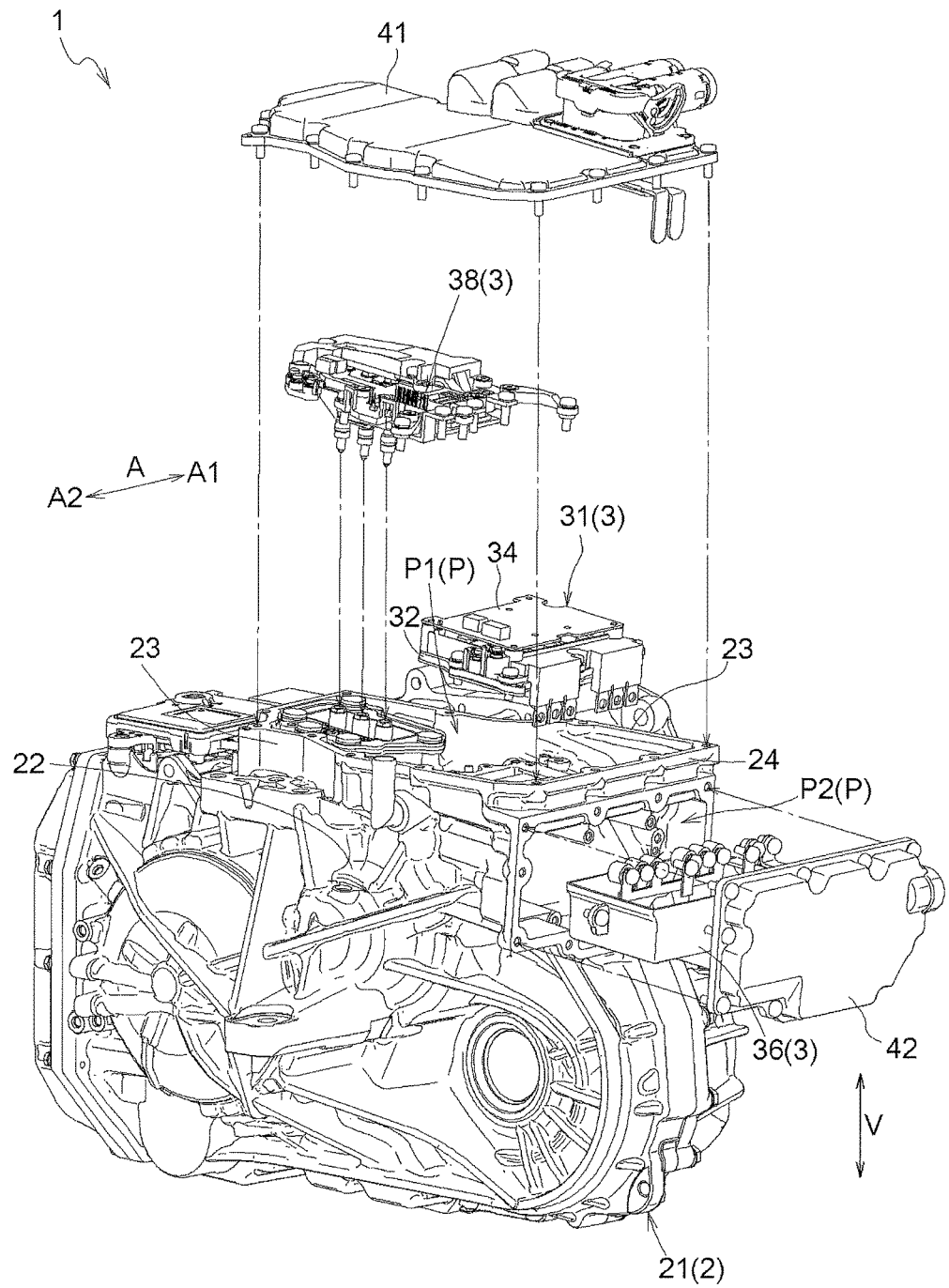
FIG. 5 is an exploded perspective view of the vehicle drive device.

As shown in FIGS. 4 and 5, in the present embodiment, the case 2 includes a cross wall portion 24 connecting the pair of projecting walls 23 to each other. The case 2 also includes a plate-like isolation wall 25 extending from the outer peripheral wall 22 toward the cross wall portion 24 (refer to FIG. 3). The isolation wall 25 divides the inverter accommodation chamber P into a first accommodation portion P1 and a second accommodation portion P2. The first accommodation portion P1 accommodates the conversion unit 31 and the pump control unit 38, and the second accommodation portion P2 accommodates the capacitor 36.

As shown in FIGS. 3 and 5, the first accommodation portion P1 and the second accommodation portion P2 open in directions different from each other. Specifically, in the vehicle-mounted state, the first accommodation portion P1 opens upward whereas the second accommodation portion P2 opens toward the rear side R. This arrangement allows the conversion unit 31 and the pump control unit 38 to be inserted from above along the vertical direction V into the first accommodation portion P1, and then fixed to the first case portion 21. This arrangement also allows the capacitor 36 to be inserted from the rear side R along the longitudinal direction L into the second accommodation portion P2, and then fixed to the first case portion 21. The conversion unit 31 and the pump control unit 38, and the capacitor 36 can be fixed to the first case portion 21 through processes independent of each other. In this state, the first accommodation portion P1 is covered with a first cover 41, and the second accommodation portion P2 is covered with a second cover 42.

The vehicle with the vehicle drive device 1 mounted thereon is basically driven based on operation of the driver, so that an unforeseen accident (such as a collision accident)

may occur. Even if the vehicle has a collision avoidance function using an image recognition technology, the possibility of a collision accident is not necessarily completely eliminated, depending on, for example, the speed difference between the vehicle and an object, the weather, and the like. Therefore, the vehicle drive device 1 is preferably designed based on a layout of installation on the vehicle with collision safety taken into account from the beginning. In view of this, the configuration of the present embodiment adopts a layout design excellent in the collision safety. The configuration allows such a layout design to be developed while downsizing the entire vehicle drive device 1. On the assumption of the vehicle-mounted state, these points will be described below.

As described above, in the present embodiment, the third axial center X3 is disposed below and on the rear side R of the first axial center X1 (refer to FIG. 3 and FIG. 6). That is, the differential gear device DF is disposed, as a whole, below and on the rear side R of the rotary electric machine MG and the transmission device TM. This arrangement provides a space above the differential gear device DF, the space overlapping at least a part of the rotary electric machine MG and the transmission device TM (here, a part of the upper side of the transmission device TM) when viewed along the longitudinal direction L from the front side F to the rear side R. A part of this space is disposed above the first axial center X1 in the vertical direction V, and is occupied by the counter gear mechanism C having, as the rotation-axial center, the second axial center X2 arranged between the first axial center X1 and the third axial center X3 in the longitudinal direction L.

The counter gear mechanism C is disposed, as a whole, above and on the rear side R of the rotary electric machine MG and the transmission device TM. The differential gear device DF is arranged, as a whole, below and on the rear side R of the counter gear mechanism C. This arrangement provides a space above the differential gear device DF, the space overlapping, as another part of the space described above, at least a part of the counter gear mechanism C (here, substantially upper halves of a member on which the first gear G1 is formed and a member on which the second gear G2 is formed) when viewed along the longitudinal direction L from the front side F to the rear side R. This space is referred to as an "overlapping space S", in the present embodiment. The overlapping space S is a valley-like space that is formed between the virtual outer circumferential surface of the counter gear mechanism C and the outer circumferential surface of the differential gear device DF disposed radially adjacent to each other, and that has a substantially V-shape when viewed from the axial direction. The "virtual outer circumferential surface of the counter gear mechanism C" is a virtual surface shaped in a circular truncated cone with two bases, one being the member on which the first gear G1 is formed, and the other being the member on which the second gear G2 is formed.

Figure 6:
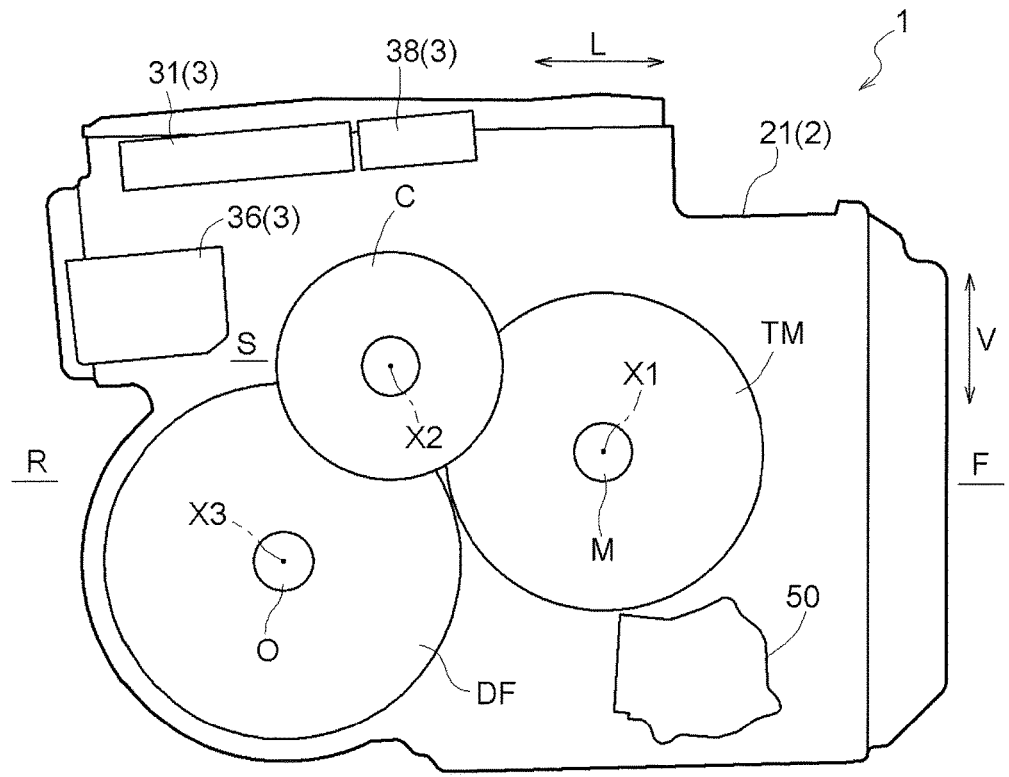
FIG. 6 is a schematic diagram showing the arrangement relationship of constituent parts when viewed in the axial direction.

As illustrated in FIG. 6, the capacitor 36 and the conversion unit 31 are disposed so as to each include a portion occupying the same position in the longitudinal direction L as that of the differential gear device DF, above the differential gear device DF. In other words, at least a part of the capacitor 36 and at least a part of the conversion unit 31 are disposed so as to each overlap the differential gear device DF in the longitudinal direction L, above the differential gear device DF. That is, regarding the arrangement of two members, when the two members occupy the same position (region) as each other in a certain direction, the state is expressed as follows: the two members "overlap in that direction". The capacitor 36 is, more specifically, disposed so as to include a portion occupying the same position in the longitudinal direction L as that of the differential gear device DF, above the differential gear device DF and on the rear side R of the counter gear mechanism C. At least a part of the capacitor 36 is arranged so as to overlap the differential gear device DF in the longitudinal direction L, above the differential gear device DF and on the rear side R of the counter gear mechanism C. The capacitor 36 is disposed so as to mostly fit within a range in the longitudinal direction L occupied by a portion on the rear side R of the third axial center X3 in the differential gear device DF.

The capacitor 36 is also disposed so as to include a portion occupying the same position in the vertical direction V as that of each of the transmission device TM and the counter gear mechanism C. In other words, at least a part of the capacitor 36 is disposed so as to overlap each of the transmission device TM and the counter gear mechanism C in the vertical direction V. The capacitor 36 is disposed so as to project above the upper end portion of the transmission device TM, and so as to mostly fit within a range in the vertical direction V occupied by a portion above the second axial center X2 in the counter gear mechanism C. The position in which the capacitor 36 is disposed as described above is also the "overlapping space S" mentioned above.

In the present embodiment, the capacitor 36 is disposed in the overlapping space S existing above the differential gear device DF and on the rear side R of the counter gear mechanism C, so that the capacitor 36 can be disposed on the vehicle rear side of the rotary electric machine MG, the transmission device TM, and the counter gear mechanism C. Thus, if an unforeseen collision accident occurs when the vehicle is running forward, the impact of the collision is absorbed by the rotary electric machine MG and the transmission device TM having a relatively large diameter and weight and by the counter gear mechanism C disposed on the rear side R thereof, and is unlikely to reach the capacitor 36. Consequently, when an unforeseen collision accident occurs, the capacitor 36 as a high-voltage component can be effectively prevented from, for example, being damaged or coming in contact with a body frame to cause an electrical leak and the like. As a result, the collision safety can be improved.

The overlapping space S described above is a dead space that can be formed in the case 2 of the vehicle drive device 1. Hence, disposing the capacitor 36 in such a position can suppress the dead space formed in the case 2 as small as possible. In this event, the capacitor 36 constituted by the film capacitor or the ceramic capacitor as in the present embodiment has a relatively high degree of freedom in shape, so that the outer shape of the capacitor 36 can easily be adapted to the cubic shape of the overlapping space S. Therefore, the dead space that can be formed in the case 2 can be suppressed as small as possible.

The conversion unit 31 is disposed so as to include a portion occupying the same position in the longitudinal direction L as that of the differential gear device DF, above the differential gear device DF and on the rear side R of the transmission device TM. In other words, at least a part of the conversion unit 31 is disposed so as to overlap the differential gear device DF in the longitudinal direction L, above the differential gear device DF and on the rear side R of the transmission device TM. The conversion unit 31 is also disposed so as to include a portion occupying the same position in the longitudinal direction L as that of the counter gear mechanism C, above the counter gear mechanism C and on the rear side R of the transmission device TM. At least a part of the conversion unit 31 is disposed so as to overlap the counter gear mechanism C in the longitudinal direction L, above the counter gear mechanism C and on the rear side R of the transmission device TM.

In the present embodiment, the conversion unit 31 and the pump control unit 38 are disposed side by side along the longitudinal direction L. Here, the conversion unit 31 and the pump control unit 38 are disposed along the same plane. The conversion unit 31 and the pump control unit 38 are disposed such that they entirely fit within a range in the longitudinal direction L occupied by the entirety of the differential gear device DF and the counter gear mechanism C. The conversion unit 31 and the pump control unit 38 are disposed so as to be positioned substantially opposite to each other in the longitudinal direction L with respect to the second axial center X2. The conversion unit 31 is disposed on the rear side R of the second axial center X2 whereas the pump control unit 38 is mostly disposed on the front side F of the second axial center X2.

The capacitor 36 and the conversion unit 31 are disposed so as to include portions occupying the same position as each other in the longitudinal direction L, above the differential gear device DF. In other words, at least a part of the capacitor 36 and at least a part of the conversion unit 31 are disposed so as to overlap each other in the longitudinal direction L, above the differential gear device DF. In the present embodiment, the conversion unit 31 is disposed so as to include a portion occupying the same position in the longitudinal direction L as that of each of the capacitor 36 and the counter gear mechanism C, above the capacitor 36 and the counter gear mechanism C. The conversion unit 31 is disposed so as to at least partially overlap each of the capacitor 36 and the counter gear mechanism C in the longitudinal direction L, above the capacitor 36 and the counter gear mechanism C.

The capacitor 36 is disposed so as to overlap (actually overlap) the conversion unit 31 when viewed in the vertical direction V, below the conversion unit 31. In the present embodiment, the width in the longitudinal direction L of the overlapping portion of the capacitor 36 and the conversion unit 31 is half or more the width in the longitudinal direction L of the capacitor 36. The conversion unit 31 is disposed close to the rear side R in the inverter accommodation chamber P while securing a space in the rear side R for installing electrical connection members (such as busbars) between the capacitor 36 and the conversion unit 31 (refer to FIG. 3). The conversion unit 31 and the capacitor 36 are disposed, as a whole, in an L-shape bending downward when viewed in the axial direction A.

In this way, in the present embodiment, the capacitor 36 and the conversion unit 31 include the portions occupying the same position as each other in the longitudinal direction L, so that the conversion unit 31 can be disposed close to the rear side R. This arrangement allows the rotary electric machine MG and the transmission device TM to at least partially shield the conversion unit 31, in addition to the capacitor 36. As a result, the collision safety can be further improved.

The capacitor 36 and the conversion unit 31 are disposed close to each other in the vertical direction V. The capacitor 36 and the conversion unit 31 are arranged so as to face each other in the vertical direction V practically only with the isolation wall 25 interposed therebetween (refer to FIG. 3). This arrangement allows the capacitor 36 to be connected to the conversion unit 31 at the shortest wiring length. In addition, in the present embodiment, the conversion unit 31 and the pump control unit 38 each formed flat have substantially the same height dimension, and are disposed so as to occupy substantially the same position in the vertical direction V. This arrangement suppress the amount of projection in the vertical direction V from the case 2 (outer peripheral wall 22) as small as possible.

In this way, in the present embodiment, the conversion unit 31, the capacitor 36, and the pump control unit 38 are disposed so as to satisfy the specifications described above by taking into account the layout in the vehicle-mounted state and shape characteristics (such as the degree of freedom in shape and the flatness ratio) of each of these units. In this way, the collision safety can be improved by sufficiently shielding the capacitor 36 as a high-voltage component, in particular. The entire vehicle drive device 1 including the conversion unit 31, the capacitor 36, and the pump control unit 38 included in the inverter device 3 is structured in a horizontally long rectangular shape when viewed in the axial direction A, as shown in FIGS. 3 and 6. The constituent parts are densely disposed in the horizontally long rectangular outer shape without interfering with each other. In this way, the entire vehicle drive device 1 including the inverter device 3 etc. is effectively downsized.

OTHER EMBODIMENTS

Finally, other embodiments of the vehicle drive device according to the present disclosure will be described below. A configuration disclosed in each of the embodiments below can be applied in combination with a configuration disclosed in any other embodiment unless any contradiction occurs.

Figure 7:
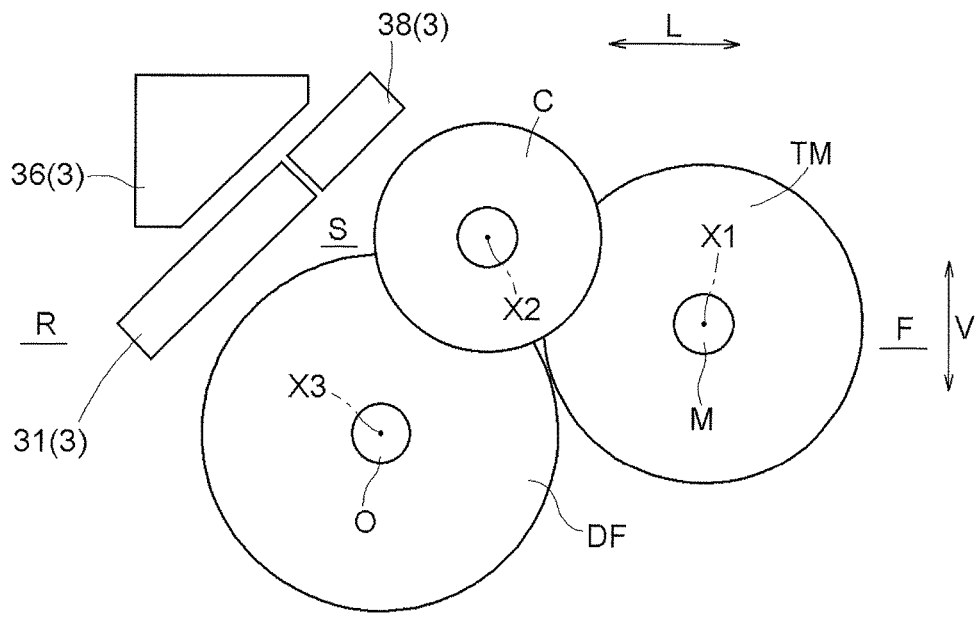
FIG. 7 is a schematic diagram showing another embodiment of the arrangement relationship of the constituent parts when viewed in the axial direction.

(1) In the embodiment described above, the capacitor 36 is disposed below the conversion unit 31. However, the embodiments of the present disclosure are not limited thereto. For example, as shown in FIG. 7, the conversion unit 31 may be arranged substantially parallel to the direction of a tangent line common to the differential gear device DF and the counter gear mechanism C, and the capacitor 36 may be disposed above the conversion unit 31.

Figure 8:
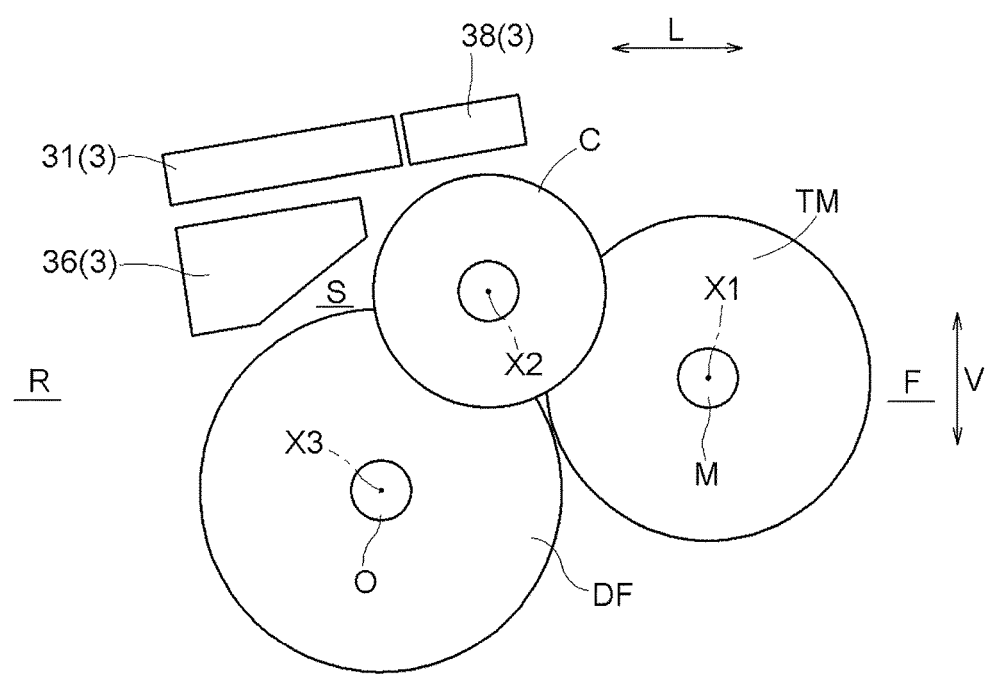
FIG. 8 is a schematic diagram showing still another embodiment of the arrangement relationship of the constituent parts when viewed in the axial direction.

(2) In the embodiment described above, only the capacitor 36 out of the capacitor 36 and the conversion unit 31 is disposed so as to include the portion occupying the same position in the vertical direction V as that of each of the transmission device TM and the counter gear mechanism C (so as to overlap each of the transmission device TM and the counter gear mechanism C in the vertical direction V). However, the embodiments of the present disclosure are not limited thereto. For example, the arrangement may be made such that only the conversion unit 31 includes a portion occupying the same position in the vertical direction V as that of each of the transmission device TM and the counter gear mechanism C. Alternatively, the arrangement may be made such that both the capacitor 36 and the conversion unit 31 include portions occupying the same position in the vertical direction V as that of each of the transmission device TM and the counter gear mechanism C (refer to FIG. 7). Still alternatively, the arrangement may be made such that at least one of the capacitor 36 and the conversion unit 31 includes a portion occupying the same position in the vertical direction V as that of only the counter gear mechanism C out of the transmission device TM and the counter gear mechanism C (refer to FIG. 8).

(3) In the embodiment described above, the conversion unit 31 and the capacitor 36 are disposed so as to overlap each other when viewed in the vertical direction V. However, the embodiments of the present disclosure are not limited to thereto. The conversion unit 31 and the capacitor 36 only need to be disposed so as to at least include portions occupying the same position as each other in the longitudinal direction L (so as to overlap each other in the longitudinal direction L), and need not overlap each other when viewed in the vertical direction V, by being disposed, for example, in different positions in the axial direction A.

(4) In the embodiment described above, the inverter device 3 includes the conversion unit 31, the capacitor 36, and the pump control unit 38, and all of these are arranged in the inverter accommodation chamber P. However, the embodiments of the present disclosure are not limited thereto. For example, the pump control unit 38 may be disposed outside the inverter accommodation chamber P, separately from the conversion unit 31 and the capacitor 36. In this case, the pump control unit 38 may be disposed, for example, in the case 2. The inverter device 3 may further include various components constituting a voltage boosting circuit. In this case, the arrangement positions of the additional components for that purpose only need to be determined by taking the collision safety into account as long as the entire device does not excessively increase in size.

(5) In the embodiment described above, the inverter device 3 is integrally fixed the case 2 directly, not via the inverter case etc. (inverter-caseless structure). However, the embodiments of the present disclosure are not limited thereto. For example, the inverter device 3 may be fixed to the case 2 via the dedicated inverter case.

(6) In the embodiment described above, the inverter device 3 is fixed to the first case portion 21 that accommodates the transmission device TM etc. However, the embodiments of the present disclosure are not limited thereto. For example, the inverter device 3 may be fixed to the second case portion 28 that accommodates the rotary electric machine MG etc. The inverter device 3 may be fixed to both the first case portion 21 and the second case portion 28.

(7) In the embodiment described above, the transmission device TM is assumed to have a single-axis configuration, in which the intermediate shaft M serving as the transmission input shaft is disposed coaxially with the transmission output gear Go serving as the transmission output member. However, the embodiments of the present disclosure are not limited thereto. For example, the transmission device TM having a multi-axis configuration may be used, in which the transmission input shaft and the transmission output member are disposed on different axes. Also in this case, the rotation-axial center (first axial center X1) of the transmission device TM is defined based on the rotation-axial center of the input shaft (transmission input shaft) of the transmission device TM. In this case, the expression "the transmission device TM is disposed coaxially with the rotary electric machine MG" means that the rotation-axial center of the transmission input shaft coincides with the rotation-axial center of the rotary electric machine MG (rotor Ro), and the rotation-axial center of the transmission output member need not coincide with the rotation-axial center of the rotary electric machine MG (rotor Ro).

(8) In the embodiment described above, the present disclosure is applied to the drive device for the hybrid vehicle. However, the embodiments of the present disclosure are not limited thereto. The present disclosure can also be applied to a drive device for an electric vehicle including only the rotary electric machine MG as a source of driving force of the wheels W on the vehicle, for example.

(9) Also regarding other configurations, the embodiments disclosed herein are illustrative in all respects, and it should be understood that the scope of the present disclosure is not limited thereto. Those skilled in the art will easily understand that the present disclosure may be altered as appropriate without departing from the scope and the spirit of the present disclosure. Thus, it is a matter of course that other embodiments obtained by altering the present disclosure without departing from the scope and the spirit of the present disclosure are also included in the scope of the present disclosure.

INDUSTRIAL APPLICABILITY

The present disclosure can be applied to a drive device for a hybrid vehicle, for example.

The invention claimed is:

1. A vehicle drive device comprising:
   a rotary electric machine;
   a transmission device that is disposed side by side with the rotary electric machine in an axial direction thereof;
   a differential gear device that has a rotation-axial center substantially parallel to that of the transmission device, and is disposed on an axis other than that of the transmission device; and
   an inverter device that includes a capacitor that smooths direct-current power and a conversion unit that performs direct current/alternating current conversion, and controls the rotary electric machine, wherein
   in a state in which the vehicle drive device is mounted on a vehicle, the rotation-axial center of the differential gear device is disposed below and on a vehicle rear side of the rotation-axial center of the transmission device, and
   at least a part of the capacitor and at least a part of the conversion unit are disposed so as to overlap each other in a vehicle front-rear direction when viewed from the axial direction, and at least a part of the capacitor and at least a part of the conversion unit are disposed so as to overlap the differential gear device in the vehicle front-rear direction when viewed from the axial direction, above the differential gear device.

2. The vehicle drive device according to claim 1, wherein the capacitor is disposed so as to overlap the conversion unit when viewed in the vertical direction, below the conversion unit.

3. The vehicle drive device according to claim 2, wherein at least one of the capacitor and the conversion unit is disposed so as to overlap the transmission device in the vertical direction.

4. The vehicle drive device according to claim 3, further comprising:
   a counter gear mechanism that has a rotation-axial center substantially parallel to those of the transmission device and the differential gear device and is arranged on an axis other than those of the transmission device and the differential gear device, wherein
   in the state in which the vehicle drive device is mounted on the vehicle, the rotation-axial center of the counter gear mechanism is disposed above the rotation-axial center of the transmission device in the vertical direction and between the rotation-axial center of the transmission device and the rotation-axial center of the differential gear device in the vehicle front-rear direction, and
   at least one of the capacitor and the conversion unit is disposed so as to overlap the counter gear mechanism in the vertical direction.

5. The vehicle drive device according to claim 4, further comprising:
   a case that accommodates the transmission device, wherein an inverter accommodation chamber that accommodates the inverter device is formed along an outer peripheral wall of the case.

6. The vehicle drive device according to claim 2, further comprising:
a counter gear mechanism that has a rotation-axial center substantially parallel to those of the transmission device and the differential gear device and is arranged on an axis other than those of the transmission device and the differential gear device, wherein
in the state in which the vehicle drive device is mounted on the vehicle, the rotation-axial center of the counter gear mechanism is disposed above the rotation-axial center of the transmission device in the vertical direction and between the rotation-axial center of the transmission device and the rotation-axial center of the differential gear device in the vehicle front-rear direction, and
at least one of the capacitor and the conversion unit is disposed so as to overlap the counter gear mechanism in the vertical direction.

7. The vehicle drive device according to claim 6, further comprising:
a case that accommodates the transmission device, wherein
an inverter accommodation chamber that accommodates the inverter device is formed along an outer peripheral wall of the case.

8. The vehicle drive device according to claim 2, further comprising:
a case that accommodates the transmission device, wherein
an inverter accommodation chamber that accommodates the inverter device is formed along an outer peripheral wall of the case.

9. The vehicle drive device according to claim 1, wherein
at least one of the capacitor and the conversion unit is disposed so as to overlap the transmission device in the vertical direction.

10. The vehicle drive device according to claim 9, further comprising:
a counter gear mechanism that has a rotation-axial center substantially parallel to those of the transmission device and the differential gear device and is arranged on an axis other than those of the transmission device and the differential gear device, wherein
in the state in which the vehicle drive device is mounted on the vehicle, the rotation-axial center of the counter gear mechanism is disposed above the rotation-axial center of the transmission device in the vertical direction and between the rotation-axial center of the transmission device and the rotation-axial center of the differential gear device in the vehicle front-rear direction, and
at least one of the capacitor and the conversion unit is disposed so as to overlap the counter gear mechanism in the vertical direction.

11. The vehicle drive device according to claim 10, further comprising:
a case that accommodates the transmission device, wherein
an inverter accommodation chamber that accommodates the inverter device is formed along an outer peripheral wall of the case.

12. The vehicle drive device according to claim 9, further comprising:
a case that accommodates the transmission device, wherein
an inverter accommodation chamber that accommodates the inverter device is formed along an outer peripheral wall of the case.

13. The vehicle drive device according to claim 1, further comprising:
a counter gear mechanism that has a rotation-axial center substantially parallel to those of the transmission device and the differential gear device and is arranged on an axis other than those of the transmission device and the differential gear device, wherein
in the state in which the vehicle drive device is mounted on the vehicle, the rotation-axial center of the counter gear mechanism is disposed above the rotation-axial center of the transmission device in the vertical direction and between the rotation-axial center of the transmission device and the rotation-axial center of the differential gear device in the vehicle front-rear direction, and
at least one of the capacitor and the conversion unit is disposed so as to overlap the counter gear mechanism in the vertical direction.

14. The vehicle drive device according to claim 13, further comprising:
a case that accommodates the transmission device, wherein
an inverter accommodation chamber that accommodates the inverter device is formed along an outer peripheral wall of the case.

15. The vehicle drive device according to claim 1, further comprising:
a case that accommodates the transmission device, wherein
an inverter accommodation chamber that accommodates the inverter device is formed along an outer peripheral wall of the case.

* * * * *